(12) United States Patent
Sasmita et al.

(10) Patent No.: US 9,054,968 B2
(45) Date of Patent: Jun. 9, 2015

(54) BUSINESS INTELLIGENCE-INFUSED SMART RETRANSMISSION PROCESSING

(71) Applicant: International Business Machines Corporation, Armonk, NY (US)

(72) Inventors: Adrian R. Sasmita, Singapore (SG); Dody Wiryadi, Auburn (AU)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/622,757

(22) Filed: Sep. 19, 2012

(65) Prior Publication Data

US 2014/0082194 A1 Mar. 20, 2014

(51) Int. Cl.
*G06F 15/173* (2006.01)
*H04L 12/26* (2006.01)
*H04L 12/823* (2013.01)
*H04L 12/853* (2013.01)

(52) U.S. Cl.
CPC ......... *H04L 43/0876* (2013.01); *H04L 47/2416* (2013.01); *H04L 47/32* (2013.01)

(58) Field of Classification Search
USPC ........................................................ 709/225
See application file for complete search history.

(56) References Cited

U.S. PATENT DOCUMENTS

| | | | |
|---|---|---|---|
| 6,097,697 A * | 8/2000 | Yao et al. ...................... | 370/230 |
| 7,096,289 B2 | 8/2006 | Brown et al. | |
| 2009/0257450 A1* | 10/2009 | Sirigiri et al. ................. | 370/474 |
| 2011/0158084 A1 | 6/2011 | Lei et al. | |

* cited by examiner

*Primary Examiner* — Tu Nguyen
(74) *Attorney, Agent, or Firm* — Lee Law, PLLC; Christopher B. Lee

(57) ABSTRACT

Business intelligence (BI) information that includes at least one application-level directive associated with a received application-level request is collected at a BI framework situated between a transport adapter layer and a network layer of a computing device. A determination is made as to whether to defer transmission of the received application-level request based upon an evaluation of the at least one application-level directive within the collected BI information relative to current network transmission conditions. The received application-level request is stored locally in response to determining to defer transmission of the received application-level request based upon the evaluation of the at least one application-level directive within the collected BI information relative to the current network transmission conditions.

16 Claims, 5 Drawing Sheets

BUSINESS INTELLIGENCE-INFUSED SMART RETRANSMISSION PROCESSING

BACKGROUND

The present invention relates to message retransmission. More particularly, the present invention relates to business intelligence-infused smart retransmission processing.

Applications executing on computing devices may originate messages destined for delivery to other applications executing on other computing devices. The applications execute within an application layer of the respective computing devices. Lower-level network layers on the computing devices physically package/partition and transmit the messages on the sending device, and receive and un-pack/re-assemble the messages on the receiving device. The receiving network layer delivers the un-packaged/re-assembled message to the destination application.

BRIEF SUMMARY

A method includes collecting, at a business intelligence (BI) framework situated between a transport adapter layer and a network layer of a computing device, BI information that comprises at least one application-level directive associated with a received application-level request; determining whether to defer transmission of the received application-level request based upon an evaluation of the at least one application-level directive within the collected BI information relative to current network transmission conditions; and storing the received application-level request locally in response to determining to defer transmission of the received application-level request based upon the evaluation of the at least one application-level directive within the collected BI information relative to the current network transmission conditions.

A system includes a memory and a processor programmed to: collect, at a business intelligence (BI) framework situated between a transport adapter layer and a network layer of a computing device, BI information that comprises at least one application-level directive associated with a received application-level request; determine whether to defer transmission of the received application-level request based upon an evaluation of the at least one application-level directive within the collected BI information relative to current network transmission conditions; and store the received application-level request locally within the memory in response to determining to defer transmission of the received application-level request based upon the evaluation of the at least one application-level directive within the collected BI information relative to the current network transmission conditions.

A computer program product includes a computer readable storage medium having computer readable program code embodied therewith, where the computer readable program code when executed on a computer causes the computer to: collect, at a business intelligence (BI) framework situated between a transport adapter layer and a network layer of a computing device, BI information that comprises at least one application-level directive associated with a received application-level request; determine whether to defer transmission of the received application-level request based upon an evaluation of the at least one application-level directive within the collected BI information relative to current network transmission conditions; and store the received application-level request locally in response to determining to defer transmission of the received application-level request based upon the evaluation of the at least one application-level directive within the collected BI information relative to the current network transmission conditions.

DETAILED DESCRIPTION

Figure 1:
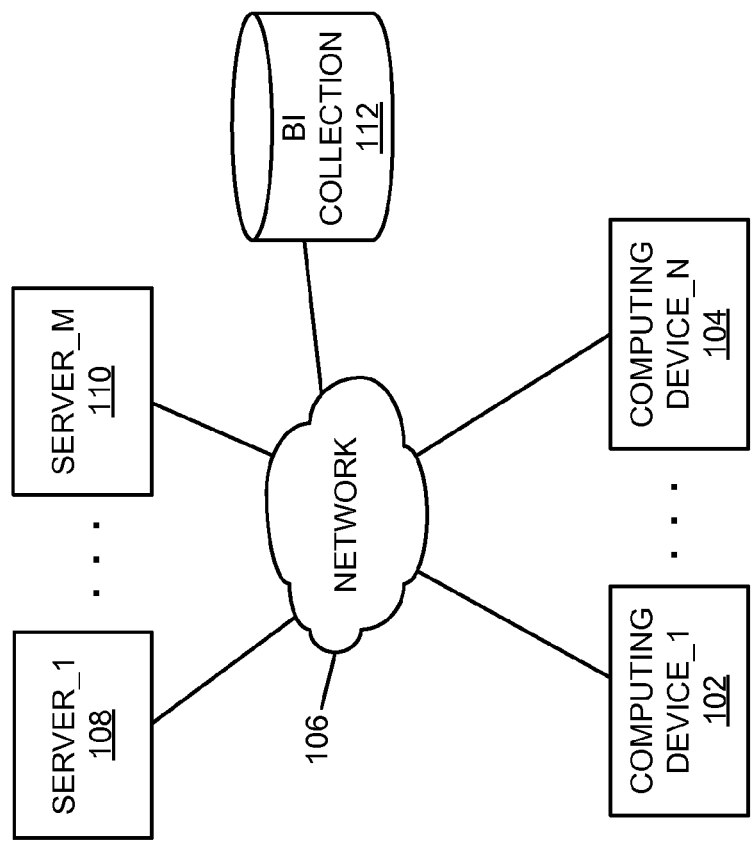
FIG. 1 is a block diagram of an example of an implementation of a system for business intelligence-infused smart retransmission processing according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides business intelligence-infused smart retransmission processing. The present technology implements a "business intelligence" (BI) framework that collects application-level directives and traffic-related business intelligence information, and utilizes the collected BI information to implement automated traffic control between an application layer and a network layer. A detailed definition of BI information is provided further below. For purposes of this introduction, BI information may be considered application-level directives regarding message processing (e.g., priorities, deadlines, etc.) and contemporaneous network conditions. The BI framework resides between one or more client application transport adapters (generally "adapters" or "transport adapters" hereafter) and a network level/interface, and provides a layer of abstraction relative to these other layers of processing, regardless of the respective transport protocol. The BI framework may use the collected BI information to make intelligent decisions regarding processing of new adapter requests (e.g., messages) and may initiate transmission or defer transmission of individual messages based upon the BI information. For message deferrals, the BI framework autonomously processes the BI information over time to determine among all outstanding requests and new requests, whether any locally-stored message is a candidate for an attempted retransmission (or initial transmission). In response to determining to initiate retransmission of a request, the BI framework resubmits the request to the transport adapter from which the request was received along with BI feedback that includes additional BI information collected during the interval. The adapter may process the BI feedback along with the original BI information associated with the message and determine whether to attempt to transmit the message again, or may determine not to attempt retransmission, as appropriate for the given message and BI information. For resubmitted requests, the BI framework again evaluates outstanding BI information and prioritizes among the resubmitted requests and all locally-stored requests to intelligently determine which request(s) to prioritize for transmission. Accordingly, unnecessary retransmissions may be reduced and network bandwidth may be conserved by implementation of the business intelligence-infused smart retransmission processing described herein.

As described above and in more detail below, processing of messages is performed, based upon ongoing local request processing activities and contemporaneous network activities, to determine whether to transmit or delay transmission of individual requests to a particular destination. Further, the BI framework may also use the collected BI information to provide BI feedback to the respective adapters. The BI framework may be implemented, for example, as an embedded BI gateway module that resides between application-level transport adapters and a network layer of a computing device.

For purposes of the present description, the phrase "business intelligence" (BI) information (collectively alternatively referred to herein as BI) refers to application-level goals/directives for individual requests (e.g., messages) or collections of requests, and refers to initial and ongoing processing information associated with the respective requests (e.g., requests that are on a local queue to resubmit). While the BI may include historical and system level statistics (e.g., transmission speed, etc.), the BI additionally includes information such as application-level request priorities, application-level request deadlines, time of initiation of an application-level request, request correlation information that correlates a request with other requests such as a payload's chunk size (e.g., if the payload is split into multiple requests/transactions), destination/recipient addresses, and transfer status such as a number of previous transmission attempts. The BI information may also include target destination(s), request (e.g., message/packet) payload size, average response time(s), timestamps when the transfer event occurs, and other information as appropriate for a given implementation. As such, the BI information defined herein represents a higher level of information that may be used for request retransmission decision making. Further, many aspects of application-level request considerations may be formed into BI information and utilized to defer and locally process messages, or adjust message transmission priorities, as appropriate for a given implementation.

Further, the term "request" or "requests" may include application-level messages or other communication actions. As such, a request may include a portion of an application-level message, an entire application-level message, or multiple application-level messages without departure from the scope of the present subject matter.

The present technology additionally provides cross-application BI information sharing. Because the BI information is collected at the BI framework (e.g., gateway), the business intelligence information gained during real-time processing may be shared across multiple applications. For example, for a situation where a trading partner server may have a hypertext transfer protocol (HTTP) server and a file transfer protocol (FTP) server that each resides on the same machine/computing device, BI information learned in response to processing associated with one transport adapter may be shared with other adapters as follows. Within the context of the HTTP server and FTP server, if a connection to the HTTP server application cannot be established in response to a request from an HTTP client adapter, and if the FTP server uses the same IP address as the HTTP server, then an FTP adapter may be advised (e.g., via BI feedback) to wait to attempt any future requests until the connection can be established. As such, request retries may further be reduced based upon the BI feedback and cross-application BI information sharing. Accordingly, more well-informed decisions by other adapters may be made in response to shared business intelligence information regarding real-time activities associated with other client adapters.

The BI framework may provide temporary local storage and processing of messages when transfer suspension or deferral occurs, as well as queue management and information (for one or more local processing queues). By using both historical data and intelligent logic regarding current ongoing processing, the BI framework may make decisions based upon a different "level" of intelligence, the BI level of intelligence as defined herein. As such, by pushing the processing described herein to a layer of abstraction between the adapters and the network layer, the BI framework logic may have a wider view of the current traffic condition and may have more information to utilize for decision making, and as such, may therefore make better decisions. Accordingly, the BI framework may adjust traffic flow dynamically based on priority/on-demand scheduling during times of traffic congestion.

However, it should be noted that, in contrast to adjusting and making decisions on a "retransmission interval" at a time of transmission failure, the present technology may be used to regularly (e.g., periodically, aperiodically, or otherwise) evaluate initial transmission and retransmission attempts, and make real-time decisions regarding whether to send a request (now or later) at the point in time of sending. As such, the transmission consideration is in real time and is not based on obsolete traffic information (e.g., what happened ten minutes earlier for example). It should additionally be noted that, in contrast to attempting to identify an optimal retransmission interval, the present technology considers a probability of success (e.g., a success-rate likelihood) for attempting to send a request now (a real-time sending determination) relative to a probability of success for attempting to send the request at a later time.

In response to determining to resubmit a request using the collected BI for ongoing request processing activities, the BI framework may resubmit the request to the respective adapter from which the request was originally received. The resubmission to the adapter provides feedback to the adapter regarding request processing. This feedback may be used by the adapter to adjust BI parameters/metadata (e.g., request priority) associated with a request that is resubmitted to the BI framework, to obsolete a message (e.g., if an effective time period for delivery has passed), or to perform other processing as appropriate for a given implementation.

For example, the feedback provided to the transport adapter may allow the transport adapter to determine when a target destination is slow in responding or not responding. In response to such a determination, the transport adapter may reduce the amount of unnecessary resend attempts by adjusting the BI associated with the respective request(s) or not resubmitting the request for delivery (e.g., if the priority is relatively low or the time window for effective delivery has expired). By adjusting the BI associated with requests, bandwidth may be reclaimed or bandwidth requirements may be distributed over time. The reclaimed bandwidth may be used to perform other transfers/tasks, which may thereby utilize the network more efficiently and increase throughput.

Any attempted request transmission that has failed during a given transfer may be considered a candidate for local storage and processing. However, using the present technology, retransmission may be deferred based upon the information gained from the transmission failure. As such, rather than flooding the network with retransmissions, the BI framework may intelligently determine when retransmission may be appropriate. The BI framework may, as described above, resubmit the request to the adapter from which the request was received to allow the adapter to influence whether to attempt retransmission or terminate retransmission attempts.

The local repository may be configurable to contain enough information to be able to orchestrate a resend automatically without user intervention. The retransmission/retry attempt may be performed by a scheduler that monitors the local processing queue. The scheduler may run as a separate or background process (e.g., a daemon) to assess the current requests under local processing and to identify data that is still eligible to be resent. Data this is identified as still eligible to be resent may be resubmitted (e.g., the original request along with any BI parameters/metadata) to the respective transport adapter.

As described above, the resubmission to the adapter constitutes feedback to the adapter regarding request processing. The BI framework may maintain a resubmission counter and provide additional feedback to the adapter. The adapter may distinguish that the resubmitted request is the result of local processing (e.g., that it is coming from the BI framework rather than an application). As such, the adapter may retrieve and update any relevant transaction accordingly to denote the resubmission of the request (e.g., update a submission time, etc.).

This added layer of abstraction within the BI framework (e.g., in the form of a BI gateway), also enables users to have a single window for monitoring the progress of their transfer. A user interface (UI) may provide a single view to actual live traffic for multiple adapters as well as historical performance, which may be used as a traffic flow indicator. This UI may also provide live performance data, such as elapsed time, estimated remaining time, throughput performance, current load, incoming load, and other information as appropriate for a given implementation. For example, users may see what data has been sent out, what data is still in progress, what data is in local processing, and other information. By having this single window of active monitoring for multiple adapters, the user may adjust the priority of the pending requests on demand, and the adjusted priority may be processed in real time by the BI framework. Users may specify whether the data is to be sent immediately, whether the data may be sent anytime, whether the data is to be sent before a certain deadline, or other criteria as appropriate for a given implementation. For data that is to be sent immediately, if the recipient is not responding or the respective network is currently unreachable, the BI framework may respond to the original (or resubmitted) requests with a return error back to the adapter. If the data is not sent after a specified deadline, the scheduler may send a notification warning back to the adapter (or to an administrator) so that further intervention or adjustment of BI information associated with that particular request may be performed.

It should be noted that conception of the present subject matter resulted from recognition of certain limitations associated with retransmission of messages/packets. For example, it was observed that, even though technology is getting better and networks are getting faster, the scope of interconnection between devices is also becoming wider and more global as more users get "online." It was additionally observed that many connectivity issues exist, such as slow network traffic, lost data during transmission, or a server being unable to keep up with the incoming bandwidth. In was further observed that a retransmission mechanism may be implemented to attempt to solve the problem of lost packets. It was also observed that retransmission mechanisms may utilize historical information to attempt to stagger a retransmission based upon a time of failure of a transmission. However, it was determined that retrying transmissions blindly, or even with historical information, is not solving the problem of network congestion and that un-necessary retries during peak periods consumes additional resources and creates additional network traffic. As such, it was determined that a smart retransmission mechanism that considers business intelligence information, such as relative application-level message priorities and application level message deadlines, to provide ongoing outgoing message queue re-evaluation to selectively retry messages may be utilized to improve network congestion. The present subject matter improves message retransmission processing by providing for business intelligence-infused smart retransmission processing, as described above and in more detail below. As such, improved message retransmission processing may be obtained by implementation of the present technology.

The business intelligence-infused smart retransmission processing described herein may be performed in real time to allow prompt ongoing re-evaluation of outgoing messaging and smart retransmission of messages based upon business intelligence information. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for business intelligence-infused smart retransmission processing. A computing device_1 102 through a computing device_N 104 communicate via a network 106 with several other devices. The other devices include a server_1 108 through a server_M 110.

As will be described in more detail below in association with FIG. 2 through FIG. 5, the computing device_1 102 through the computing device_N 104 may each provide automated business intelligence-infused smart retransmission processing. The automated business intelligence-infused smart retransmission processing is based upon analysis of business intelligence information associated with application level requests and ongoing evaluation of local request processing (e.g., request storage and resubmission). As such, a variety of possibilities exist for implementation of the present subject matter, and all such possibilities are considered within the scope of the present subject matter.

It should be noted that any of the respective computing device_1 102 through the computing device_N 104 described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, tablet computing device, music recording or playback device, etc.), or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

For purposes of the present examples, it may further be assumed that any of the server_1 108 through the server_M 110 may execute multiple server applications, such as an HTTP server application, an FTP server application, or other server applications as appropriate for a given implementation. As described above, business intelligence information learned in association with processing an application request directed to one server application associated with a particular server device may be utilized for cross-application business intelligence information data sharing. As such, where an HTTP server application and an FTP server application utilize the same Internet protocol (IP) address and a transmission problem occurs with respect to either server application, this real-time business intelligence information may be used to evaluate probabilities of success for transmission of requests from other client adapters to other server applications hosted by the same server device. Accordingly, initial requests and retransmissions of requests may be dynamically adjusted across multiple client adapters.

A business intelligence (BI) information collection database 112 stores business intelligence information for use in performing the business intelligence-infused smart retransmission processing described herein. Accordingly, any of the devices illustrated within FIG. 1 may utilize information within the BI collection database 112 to implement business intelligence-infused smart retransmission processing.

Figure 2:
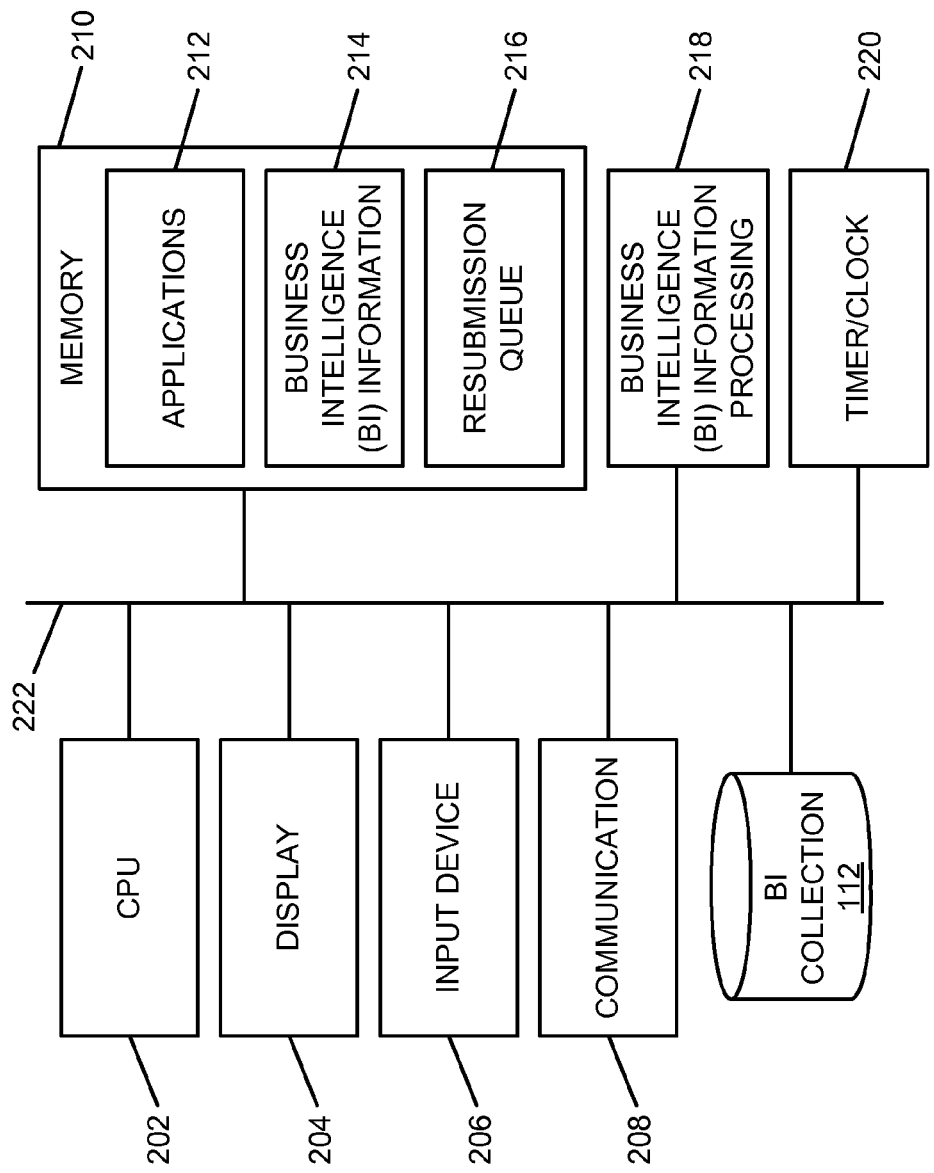
FIG. 2 is a block diagram of an example of an implementation of a core processing module capable of performing business intelligence-infused smart retransmission processing according to an embodiment of the present subject matter.

FIG. 2 is a block diagram of an example of an implementation of a core processing module 200 capable of performing business intelligence-infused smart retransmission processing. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of business intelligence information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application storage and execution area 212 that provides storage and execution of client applications when implemented in association with one or more of the computing device_1 102 through the computing device_N 104, or for server applications when implemented in association with one or more of the server_1 108 through the server_M 110. The memory 210 also includes a business intelligence (BI) information storage area 214. The BI storage area 214 may store business intelligence information associated with requests, as described above and in more detail below. The memory 210 additionally includes a resubmission queue storage area 216 that provides storage for one or more local request resubmission queues usable for request transmission deferral and retransmission determinations by local request processing associated with business intelligence-infused smart retransmission processing, as also described above and in more detail below It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A business intelligence (BI) information processing module 218 is also illustrated. The business intelligence (BI) information processing module 218 provides processing of business intelligence information for the core processing module 200, as described above and in more detail below. The business intelligence (BI) information processing module 218 operates as a BI framework as described above and implements the automated business intelligence-infused smart retransmission processing of the core processing module 200.

It should be noted that the business intelligence (BI) information processing module 218 may form a portion of other circuitry described without departure from the scope of the present subject matter. Further, the business intelligence (BI) information processing module 218 may alternatively be implemented as an application stored within the memory 210. In such an implementation, the business intelligence (BI) information processing module 218 may include instructions executed by the CPU 202 for performing the functionality described herein. The CPU 202 may execute these instructions to provide the processing capabilities described above and in more detail below for the core processing module 200. The business intelligence (BI) information processing module 218 may form a portion of an interrupt service routine (ISR), a portion of an operating system, a portion of a browser application, or a portion of a separate application without departure from the scope of the present subject matter.

A timer/clock module 220 is illustrated and used to determine timing and date information, such as timing information associated with requests and retransmissions, as described above and in more detail below. As such, the business intelligence (BI) information processing module 218 may utilize information derived from the timer/clock module 220 for information processing activities, such as the business intelligence-infused smart retransmission processing described herein.

The BI collection database 112 is also shown associated with the core processing module 200 within FIG. 2 to show that the BI collection database 112 may be coupled to the core processing module 200 without requiring external connectivity, such as via the network 106. The BI collection database 112 may be used to share business intelligence information determinations across client adapters of one or more computing devices, such as the computing device_1 102 through the computing device_N 104.

The CPU 202, the display 204, the input device 206, the communication module 208, the memory 210, the business intelligence (BI) information processing module 218, the timer/clock module 220, and the BI collection database 112 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the BI collection database 112 is illustrated as a separate component for purposes of example, the information stored within the BI collection database 112 may also/alternatively be stored within the memory 210 without departure from the scope of the present subject matter. Accordingly, the core processing module 200 may take many forms and may be associated with many platforms.

Figure 3:
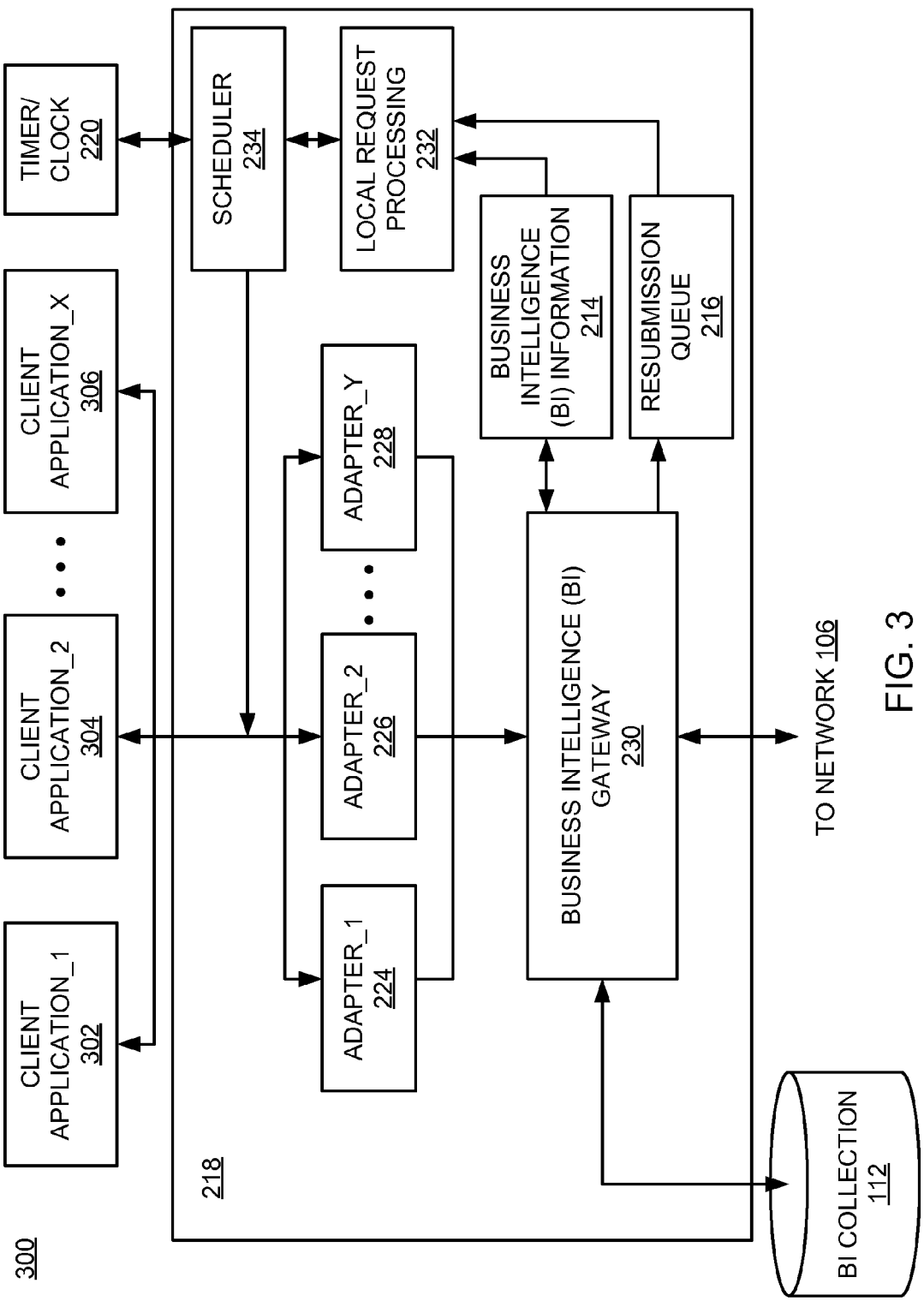
FIG. 3 is a block diagram of an example of an implementation of a logical flow of information between the business intelligence (BI) information processing module of FIG. 2 and a set of client applications to implement business intelligence-infused smart retransmission processing according to an embodiment of the present subject matter.

FIG. 3 is a block diagram of an example of an implementation of a logical flow 300 of information between the business intelligence (BI) information processing module 218 of FIG. 2 and a set of client applications to implement business intelligence-infused smart retransmission processing. The BI processing module 218 is illustrated in more granular detail and is shown to interface with the network 106 for initial transmission and retransmission of application requests. It is additionally noted that the business intelligence (BI) information storage area 214 and the resubmission queue storage area 216 are illustrated within the business intelligence (BI) information processing module 218 within the present example for ease of illustration purposes. A client application_1 302, a client application_2 304, through a client application_X 306 interact with one or more of an adapter_1 224, and adapter_2 226, through an adapter_Y 228 to initiate application level requests (e.g., messaging to a server application hosted by a server device). The requests may include business intelligence information or the business intelligence information may be added by the respective adapter_1 224 through the adapter_Y 228. The adapter_1 224 through the adapter_Y 228 may respond to client application requests by performing request preprocessing, including request validation and business intelligence information preprocessing.

For purposes of the present examples, the requests include business intelligence information as described above that may be utilized to characterize the individual requests with respect to priority and other business intelligence information-related factors for initial transmission and retransmission. A business intelligence (BI) gateway 230 receives the requests from individual adapters and extracts the business intelligence information from the requests. The BI gateway 230 may share business intelligence information obtained during processing of any requests across client adapters and other requests.

The BI gateway 230 may make a determination, based upon the extracted business intelligence information and ongoing analysis of network connectivity for other requests (e.g., within the BI collection database 112), as to whether to transmit the message or store the message for local processing and later transmission. The BI gateway 230 may also store the extracted business intelligence information, and ongoing determinations based upon the extracted business intelligence information regarding probabilities of success for transmission of requests, within the BI storage area 214. In response to determining to transmit a request based upon the business intelligence information determination(s), the BI gateway 230 may transmit the request via the network 106. In response to determining not to transmit a request based upon the business intelligence information determination(s), the BI gateway 230 may store the request for local processing on a local request resubmission queue implemented within the resubmission queue storage area 216, and may notify a local request processing module 232 to begin local processing for the queued request. It should be noted that storage of the request on the queue may be implemented to trigger the notification to the local request processing module 232. Alternatively, the notification may be provided using the business intelligence information storage area 214, such as by writing to a register that triggers an interrupt/event to the local request processing module 232.

The local processing module 232 may evaluate the stored business intelligence information associated with the request, such as request priority, request type, or other form of business intelligence information. The local processing module 232 may interact with a scheduler module 234 to implement resubmission of the request to the respective adapter from which the request was received based upon the business intelligence information, as described above and in more detail below. The scheduler module 234 may utilize the timer/clock module 220 to establish scheduling for resubmission determinations, which may result in resubmission of the application-level request to the adapter from which the request was received. The scheduler module 234 may further provide updated contemporaneous network condition information to the adapter for decision making purposes. The respective adapter may attempt retransmission of the request based upon an evaluation of the business intelligence information (e.g., application-level directive(s)) associated with the request relative to the contemporaneous network conditions. For example, the adapter may evaluate application-level directives such as the relative priority of the request, the current delay associated with the request, and other business intelligence information as appropriate for a given implementation, relative to a potential for successful contemporaneous transmission of the message. The adapter may decide to attempt retransmission or not to retransmit the request based upon this evaluation. In either circumstance, the local queue deferral processing for the request may reduce network congestion by reducing retransmission attempts for the request.

Figure 4:
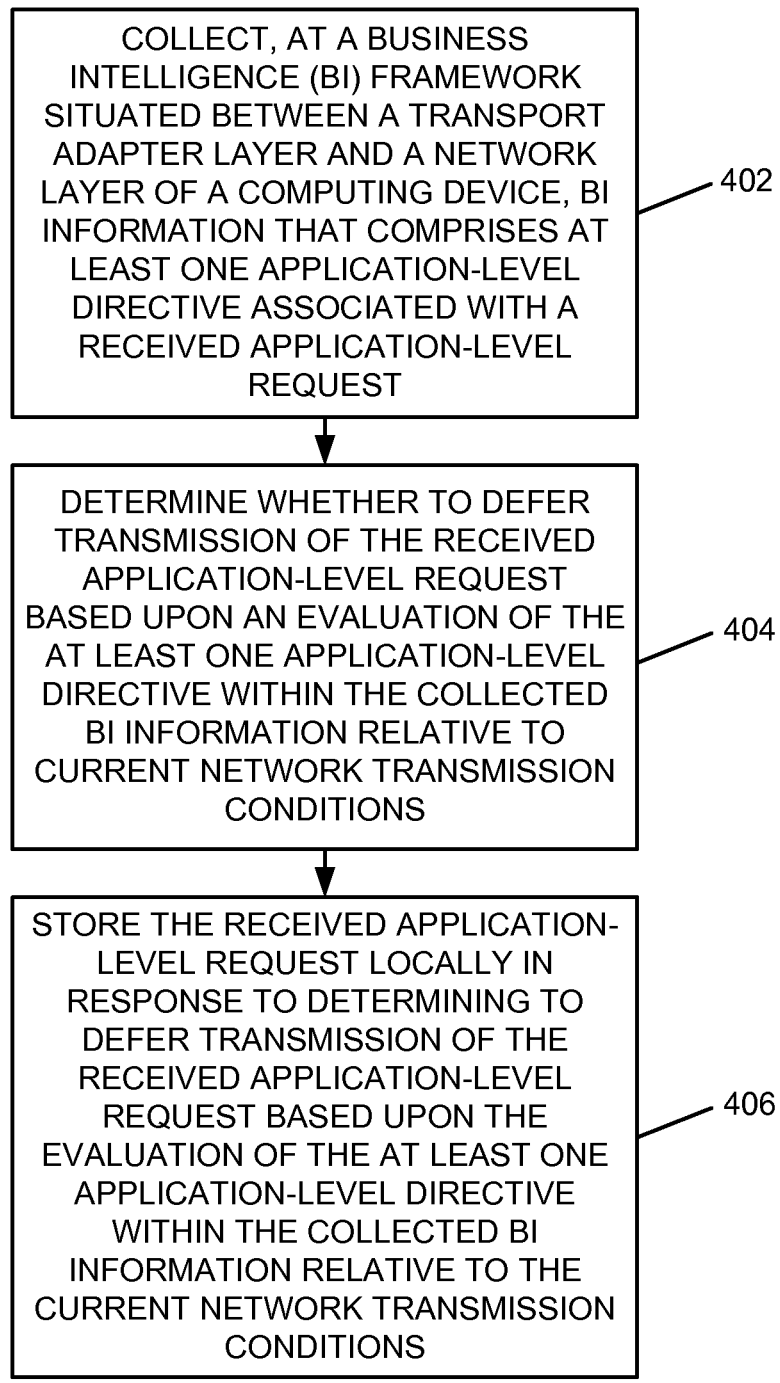
FIG. 4 is a flow chart of an example of an implementation of a process for business intelligence-infused smart retransmission processing according to an embodiment of the present subject matter.
Figure 5:
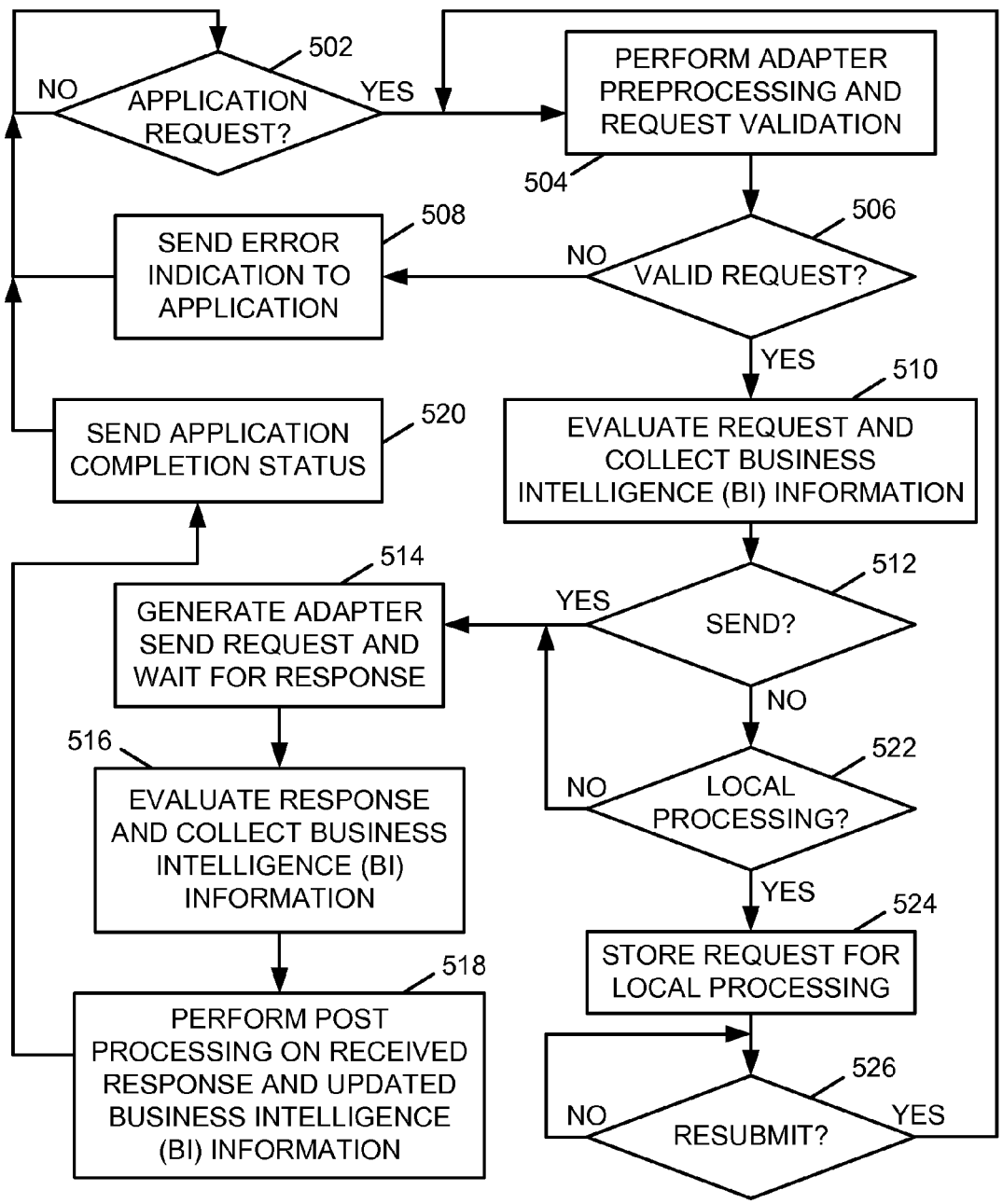
FIG. 5 is a flow chart of an example of an implementation of a process for business intelligence-infused smart retransmission processing according to an embodiment of the present subject matter.

FIG. 4 through FIG. 5 described below represent example processes that may be executed by devices, such as the core processing module 200, to perform the business intelligence-infused smart retransmission processing associated with the present subject matter. Many other variations on the example processes are possible and all are considered within the scope of the present subject matter. The example processes may be performed by modules, such as the business intelligence (BI) information processing module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for business intelligence-infused smart retransmission processing. At block 402, the process 400 collects, at a business intelligence (BI) framework situated between a transport adapter layer and a network layer of a computing device, BI information that comprises at least one application-level directive associated with a received application-level request. At block 404, the process 400 determines whether to defer transmission of the received application-level request based upon an evaluation of the at least one application-level directive within the collected BI information relative to current network transmission conditions. At block 406, the process 400 stores the received application-level request locally in response to determining to defer transmission of the received application-level request based upon the evaluation of the at least one application-level directive within the collected BI information relative to the current network transmission conditions.

FIG. 5 is a flow chart of an example of an implementation of a process 500 for business intelligence-infused smart retransmission processing. At decision point 502, the process 500 makes a determination as to whether a client application request including business intelligence (BI) information has been detected/received. A determination as to whether a client application request that includes business intelligence information has been detected/received may be performed by one of the adapter_1 224 through the adapter_Y 228.

In response to determining that a client application request that includes BI has been detected/received, the process 500 performs adapter preprocessing and request validation at block 504. A determination of the validity of request may include business intelligence information and data field parameter validation, urgency and priority validation, or other parameter validation and preprocessing as appropriate for a given implementation. Additional preprocessing may include ensuring that if the request is submitted that the adapter is capable of taking over for the requesting application to make/establish/change retransmission criteria, thus ensuring that business goals that do rely on data types at an adapter layer are satisfied. Each adapter is held responsible for validating requests according to its own protocols and/or standards.

At decision point 506, the process 500 makes a determination as to whether the request is valid. If the request is not valid, process 500 sends an error indication to the application at block 508 and returns to decision point 502 and iterates as described above. In response to determining that the request is valid at decision point 506, the process 500 evaluates the request and collects business intelligence (BI) information at block 510. The processing to evaluate the request and collect business intelligence information may be performed, for example, by the business intelligence (BI) gateway 230. The process 500 collects business intelligence information from metadata included with the request. The collected business intelligence information provides information regarding application level directives, and may include one or more of an application-level request priority, an application-level request deadline, a time of initiation of an application-level request, request correlation information that correlates the application-level request with other requests, a transfer status comprising a number of previous transmission attempts, and/or additional information as described above. The process 500 may also collect business intelligence information associated with deferred requests that are currently locally-queued and undergoing local processing for resubmission to transport adapters. The process 500 may further collect business intelligence information from current network processing activities, such as responses to other processed requests. As such, the process 500 may collect and evaluate all available BI information that includes one or more application-level directives for use in making transmission or deferral determinations for any received or queued requests. Additionally, the respective adapters 224 through 228 may be provided with updated business intelligence information associated with current network processing activities so that the adapters may have a current set of BI information at all times based upon response BI information collected by the gateway for other processed requests.

At decision point 512, the process 500 makes a determination as to whether to send the request contemporaneously with receipt of the request or to consider deferral and local processing for the request based upon the evaluated and collected business intelligence information. In response to determining at decision point 512 to send the request contemporaneously with receipt of the request based upon the evaluation of the business intelligence information, the process 500 generates an adapter send request and waits for a response from a server application at block 514. At block 516, the process 500 evaluates any response that is received and collects business intelligence (BI) information from the response. The process 500 may, for example, determine if the request is successful or unsuccessful. If the request is not successful, the process 500 may determine a state of errors associated with the request. The process 500 may determine whether any error is a fatal error or a transient error, and may make other determinations as appropriate for a given implementation. For example, as new protocols are developed that provide more complex/comprehensive error messages, process 500 may evaluate these error messages. The evaluations may be stored as additional business intelligence (BI) information and may be propagated to the respective adapters 224 through 228 and shared. As such, the adapters 224 through 228 may make better determinations as to whether to attempt retransmission of unsuccessful requests based upon this updated BI.

At block 518, the process 500 performs post processing upon the received response and the updated BI. The post processing may be handed off and performed by the respective adapter_1 224 through the adapter_Y 228 from which the original request was received. As such, the process 500 may give control back to the respective adapter with the updated BI to provide feedback to the respective adapter. The process 500 sends the application a completion status at block 520 and returns to decision point 502 and iterates as described above.

Returning to the description of decision point 512, in response to determining not to send the request contemporaneously with the receipt of the request, the process 500 makes a determination at decision point 522 as to whether to defer transmission of the request and perform local processing of the request for resubmission to the respective adapter from which the request was received. The determination as to whether to defer transmission of the request and perform the local processing of the request for resubmission may be based upon any of the collected business intelligence information described above. For example, a particular application-level request may have a deadline and may not be deferred. As such, the process 500 may determine not to defer transmission and invoke transmission of the application-level request. Other determinations with respect to deferral or invocation of transmission may be performed and all are considered within the scope of the present subject matter.

In response to determining not to defer transmission and not to perform local processing of the application-level request for resubmission based upon evaluation of the collected business intelligence information, the process 500 returns to block 514 and iterates as described above. In response to determining at decision point 522 to defer transmission and perform local processing of the application-level request for resubmission based upon the evaluation of the collected business intelligence information, the process 500 stores the request for local processing, such as within a request resubmission queue in the resubmission queue storage area 216, at block 524.

At block 524 the process 500 may also schedule re-evaluation of the application-level directive(s) within the collected BI information relative to contemporaneous network transmission conditions at the scheduled time. By scheduling re-evaluation of the BI information at a scheduled point in time, the re-evaluation of the application-level directive(s) allows consideration of directives relative to current/contemporaneous network conditions.

At decision point 526, the process 500 makes a determination as to whether to resubmit the application-level request to the respective transport adapter within the adapter level from which the application-level request was received. The processing of decision point 526 may be performed, for example, by the scheduler module 234. The process 500 may determine, at the scheduled time, whether the application-level directive(s) within the collected BI information indicates a change of urgency for one or more application-level requests. The process 500 may also determine whether the contemporaneous network transmission conditions at the scheduled time indicate a higher likelihood of transmission success relative to the network conditions at the time of receipt the application-level request or any stored/queued application-level requests. The process 500 may further share the collected BI information among transport adapters within the transport level, and the respective transport adapters may evaluate the collected BI information to adjust application-level directives of any pending application-level request (whether a resubmitted request or an initial/originated request). The process 500 may resubmit one or more stored application-level requests to a respective transport adapter within the transport adapter layer from which the respective application-level request was received.

The resubmission may be performed in response to determining an indication of a change of urgency for the respective application-level request. Additionally and/or alternatively, the resubmission may be performed in response to determining an indication of a higher likelihood of transmission success relative to the current network conditions at the receipt of the respective application-level request.

As such, the scheduler module 234 may evaluate the respective request resubmission queue(s) and evaluate all messages currently in queue for resubmission. The scheduler module 234 may utilize the timer/clock module 220 to establish/schedule periodic or aperiodic intervals of time for which to evaluate queued requests, and may receive an indication (e.g., an interrupt) associated with any such scheduled request resubmission queue evaluation. The scheduler module 234 may make a determination as to whether the collected BI information relative to any request indicates an appropriate time to resubmit any queued request based upon the currently available (contemporaneous) business intelligence information.

For example, the process 500 may rank application-level directives associated with other stored application-level requests relative to one or more application-level directives associated with the received application-level request. The process 500 may determine, based upon the evaluated application-level directives associated with the other stored application-level requests relative to one or more application-level directives associated with the received application-level request within the business intelligence information, whether any other stored application-level requests have a higher urgency than the received application-level request. The process 500 may further determine to defer transmission of the received application-level request based upon a determination that at least one other stored application-level request has a higher urgency than the received application-level request.

The process 500 may further update the BI information associated with the resubmitted request with the contemporaneous network transmission conditions at the scheduled time at which resubmission of the request is determined. In response to receiving the resubmitted application-level request, the respective transport adapter may evaluate the updated BI information to determine whether to attempt retransmission of the resubmitted application-level request based upon the application-level directives associated with the respective request and the contemporaneous network transmission conditions at the scheduled time within the updated BI information.

As such, the scheduled request resubmission queue processing is not necessarily a first in first out (FIFO) process. In contrast, the process 500 may deterministically resend individual requests based upon the business intelligence information associated with the respective queued requests and current/contemporaneous network business intelligence information. The process 500 may individually select any application-level request from a request resubmission queue to resubmit to the respective transport adapter from which it was originally received. The respective transport adapter may re-evaluate the BI associated with the message, and may change the BI to adjust a transmission priority or other application-level criterion, or may omit an attempted retransmission as appropriate for a given request and the associated BI information.

In response to determining to resubmit any queued application-level request at decision point 526, the process 500 resubmits the respective application-level request to the adapter level and the respective adapter from which it was original received and returns to block 504 (and the respective adapter level) to perform preprocessing and request validation once again for the respective resubmitted request. By performing the preprocessing once again at the adapter level, the process 500 and the respective adapter may reevaluate the initial determination by the respective adapter in view of the currently available business intelligence information and changes of priority (e.g., request aging, etc.). As such, the respective adapter may make a different determination with respect to attempting to retransmit the request (e.g., where a request has a lower priority or an effective time period for delivery of the request has expired). Accordingly, the updated business intelligence information may be re-evaluated at the adapter level based upon business intelligence information stored in association with the current request in association with other requests.

It should be noted, that where a determination is made by the respective adapter not to attempt to retransmit the request in response to a resubmission of the request to the adapter level, the process 500 may make a determination that the request is no longer a valid request at decision point 506. As such, in response to determining that the request is no longer a valid request, the process 500 may again send an error indication to the respective application that originated the request at block 508 and return to decision point 502 and iterate as described above.

However, in response to determining to attempt retransmission, the adapter may attempt retransmission of the respective application-level request, either with the original application-level directives or with updated/changed application-level directives represented within the BI information. As such, for any resubmitted request for which retransmission is to be attempted by the respective adapter, the process 500 may receive, at the BI framework level from the transport adapter, the resubmitted application-level request. The process 500 may again determine whether to transmit the received resubmitted request based upon evaluation of the updated BI information relative to network conditions at a time of receipt of the resubmitted application-level request from the transport adapter and application-level directives of BI information associated with stored application-level requests currently under local processing at block 510. The process 500 may also initiate transmission of the received resubmitted request at decision point 512 in response to determining that the received resubmitted request has a higher urgency than each of the stored application-level requests currently under local processing.

As such, the process 500 performs ongoing evaluation of business intelligence information associated with requests and current network capabilities (e.g., congestion, throughput, bandwidth, etc.) to determine whether to initially send or locally store and process outstanding requests. Where requests are processed locally, the requests are queued and scheduled for resubmission to the adapter level based upon business intelligence information associated with the individual requests and current network business intelligence information. Accordingly, the process 500 provides a flexible and dynamic approach for ongoing real-time evaluations of information that is relevant to predicted successful delivery of individual outstanding requests.

As described above in association with FIG. 1 through FIG. 5, the example systems and processes provide business intelligence-infused smart retransmission processing. Many other variations and additional activities associated with business intelligence-infused smart retransmission processing are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a memory; and
    a processor programmed to:
        collect, at a business intelligence (BI) framework operating as a layer situated between a transport adapter layer and a network layer of a computing device, BI information that comprises at least one application-level directive associated with a received application-level request;
        determine whether to defer transmission of the received application-level request based upon an evaluation of the at least one application-level directive within the collected BI information relative to current network transmission conditions; and
        store the received application-level request locally within the memory in response to determining to defer transmission of the received application-level request based upon the evaluation of the at least one application-level directive within the collected BI information relative to the current network transmission conditions.

2. The system of claim 1, where in being programmed to determine whether to defer transmission of the received application-level request based upon the evaluation of the at least one application-level directive within the collected BI information relative to the current network transmission conditions, the processor is programmed to:
    rank application-level directives associated with other stored application-level requests relative to the at least one application-level directive associated with the received application-level request;
    determine, based upon the ranked application-level directives associated with the other stored application-level requests relative to the at least one application-level directive associated with the received application-level request, that at least one other stored application-level request has a higher urgency than the received application-level request; and
    determine to defer transmission of the received application-level request based upon the determination that the at least one other stored application-level request has the higher urgency than the received application-level request.

3. The system of claim 2, where the processor is further programmed to:
    resubmit, in response to deferring transmission of the received application-level request, the at least one other stored application-level request to a transport adapter from which the at least one other stored application-level request was received; and
    where, in response to receiving the resubmitted at least one other stored application-level request, the transport adapter evaluates at least one application directive associated with the resubmitted at least one other stored application-level request to determine whether to attempt retransmission of the resubmitted at least one other stored application-level request.

4. The system of claim 1, where the processor is further programmed to:
    schedule re-evaluation of the at least one application-level directive within the collected BI information at a scheduled time; and
    in response to determining that the scheduled time has arrived:
        determine whether the at least one application-level directive within the collected BI information indicates a change of urgency for the application-level request;
        determine whether contemporaneous network transmission conditions indicate a higher likelihood of transmission success relative to the current network transmission conditions at the receipt of the application-level request; and
        resubmit the stored application-level request to a transport adapter within the transport adapter layer from which the application-level request was received in response to determining at least one of the indication of the change of urgency for the application-level request and the indication of the higher likelihood of transmission success relative to the current network transmission conditions at the receipt of the application-level request.

5. The system of claim 4, where the processor is further programmed to:
    update the BI information associated with the resubmitted application-level request with the contemporaneous network transmission conditions at the scheduled time; and
    where, in response to receiving the resubmitted application-level request, the transport adapter evaluates the updated BI information to determine whether to attempt retransmission of the resubmitted application-level request based upon the at least one application-level directive and the contemporaneous network transmission conditions at the scheduled time within the updated BI information.

6. The system of claim 5, where the processor is further programmed to:
    receive, from the transport adapter, the resubmitted application-level request in response to the transport adapter determining to attempt retransmission of the resubmitted application-level request;
    determine whether to transmit the received resubmitted application-level request based upon an evaluation of the updated BI information associated with the resubmitted application-level request:
        relative to contemporaneous network transmission conditions associated with a time of receipt of the resubmitted application-level request from the transport adapter; and
        relative to application-level directives of BI information associated with other stored application-level requests currently under local processing; and
    transmit the received resubmitted application-level request in response to determining that at least one of:
        the contemporaneous network transmission conditions associated with the time of receipt of the resubmitted application-level request indicate a likelihood of transmission success; and the received resubmitted application-level request has a higher urgency than each of the other stored application-level requests currently under local processing.

7. The system of claim 1, where the processor is further programmed to:
share the collected BI information among a plurality of transport adapters within the transport adapter layer, where the plurality of transport adapters evaluate the collected BI information to adjust at least one application-level directive of at least one pending application-level request.

8. The system of claim 1, where the at least one application-level directive within the BI information comprises at least one of:
an application-level request priority;
an application-level request deadline;
a time of initiation of the application-level request;
request correlation information that correlates the application-level request with other application-level requests; and
a transfer status comprising a number of previous transmission attempts.

9. A computer program product, comprising:
a non-transitory computer readable storage medium having computer readable program code embodied therewith, where the computer readable program code when executed on a computer causes the computer to:
collect, at a business intelligence (BI) framework operating as a layer situated between a transport adapter layer and a network layer of a computing device, BI information that comprises at least one application-level directive associated with a received application-level request;
determine whether to defer transmission of the received application-level request based upon an evaluation of the at least one application-level directive within the collected BI information relative to current network transmission conditions; and
store the received application-level request locally in response to determining to defer transmission of the received application-level request based upon the evaluation of the at least one application-level directive within the collected BI information relative to the current network transmission conditions.

10. The computer program product of claim 9, where in causing the computer to determine whether to defer transmission of the received application-level request based upon the evaluation of the at least one application-level directive within the collected BI information relative to the current network transmission conditions, the computer readable program code when executed on the computer causes the computer to:
rank application-level directives associated with other stored application-level requests relative to the at least one application-level directive associated with the received application-level request;
determine, based upon the ranked application-level directives associated with the other stored application-level requests relative to the at least one application-level directive associated with the received application-level request, that at least one other stored application-level request has a higher urgency than the received application-level request; and
determine to defer transmission of the received application-level request based upon the determination that the at least one other stored application-level request has the higher urgency than the received application-level request.

11. The computer program product of claim 10, where the computer readable program code when executed on the computer further causes the computer to:
resubmit, in response to deferring transmission of the received application-level request, the at least one other stored application-level request to a transport adapter from which the at least one other stored application-level request was received; and
where, in response to receiving the resubmitted at least one other stored application-level request, the transport adapter evaluates at least one application directive associated with the resubmitted at least one other stored application-level request to determine whether to attempt retransmission of the resubmitted at least one other stored application-level request.

12. The computer program product of claim 9, where the computer readable program code when executed on the computer further causes the computer to:
schedule re-evaluation of the at least one application-level directive within the collected BI information at a scheduled time; and
in response to determining that the scheduled time has arrived:
determine whether the at least one application-level directive within the collected BI information indicates a change of urgency for the application-level request;
determine whether contemporaneous network transmission conditions indicate a higher likelihood of transmission success relative to the current network transmission conditions at the receipt of the application-level request; and
resubmit the stored application-level request to a transport adapter within the transport adapter layer from which the application-level request was received in response to determining at least one of the indication of the change of urgency for the application-level request and the indication of the higher likelihood of transmission success relative to the current network transmission conditions at the receipt of the application-level request.

13. The computer program product of claim 12, where the computer readable program code when executed on the computer further causes the computer to:
update the BI information associated with the resubmitted application-level request with the contemporaneous network transmission conditions at the scheduled time; and
where, in response to receiving the resubmitted application-level request, the transport adapter evaluates the updated BI information to determine whether to attempt retransmission of the resubmitted application-level request based upon the at least one application-level directive and the contemporaneous network transmission conditions at the scheduled time within the updated BI information.

14. The computer program product of claim 13, where the computer readable program code when executed on the computer further causes the computer to:
receive, from the transport adapter, the resubmitted application-level request in response to the transport adapter determining to attempt retransmission of the resubmitted application-level request;
determine whether to transmit the received resubmitted application-level request based upon an evaluation of the updated BI information associated with the resubmitted application-level request:
- relative to contemporaneous network transmission conditions associated with a time of receipt of the resubmitted application-level request from the transport adapter; and
- relative to application-level directives of BI information associated with other stored application-level requests currently under local processing; and transmit the received resubmitted application-level request in response to determining that at least one of:
- the contemporaneous network transmission conditions associated with the time of receipt of the resubmitted application-level request indicate a likelihood of transmission success; and
- the received resubmitted application-level request has a higher urgency than each of the other stored application-level requests currently under local processing.

15. The computer program product of claim 9, where the computer readable program code when executed on the computer further causes the computer to:

share the collected BI information among a plurality of transport adapters within the transport adapter layer, where the plurality of transport adapters evaluate the collected BI information to adjust at least one application-level directive of at least one pending application-level request.

16. The computer program product of claim 9, where the at least one application-level directive within the BI information comprises at least one of:

an application-level request priority;

an application-level request deadline;

a time of initiation of the application-level request;

request correlation information that correlates the application-level request with other application-level requests; and a transfer status comprising a number of previous transmission attempts.

* * * * *